United States Patent
Jung (10) Patent No.: US 9,977,243 B2
(45) Date of Patent: May 22, 2018

(54) METHOD FOR EXECUTING VEHICLE FUNCTION USING WEARABLE DEVICE AND VEHICLE FOR CARRYING OUT THE SAME

(71) Applicant: Hyundai Motor Company, Seoul (KR)

(72) Inventor: Kyong Jo Jung, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 105 days.

(21) Appl. No.: 14/812,899

(22) Filed: Jul. 29, 2015

(65) Prior Publication Data
US 2016/0207539 A1 Jul. 21, 2016

(30) Foreign Application Priority Data

Jan. 16, 2015 (KR) ........................ 10-2015-0008156

(51) Int. Cl.
| | | |
|---|---|---|
| *G02B 27/01* | (2006.01) | |
| *G06F 3/01* | (2006.01) | |
| *G06F 3/0346* | (2013.01) | |
| *B60W 50/14* | (2012.01) | |

(52) U.S. Cl.
CPC ......... *G02B 27/0172* (2013.01); *B60W 50/14* (2013.01); *G06F 3/013* (2013.01); *G06F 3/0346* (2013.01); *B60W 2050/146* (2013.01); *G02B 2027/014* (2013.01); *G02B 2027/0138* (2013.01); *G02B 2027/0141* (2013.01); *G02B 2027/0178* (2013.01)

(58) Field of Classification Search
None
See application file for complete search history.

(56) References Cited

U.S. PATENT DOCUMENTS

| | | | | |
|---|---|---|---|---|
| 2005/0046953 A1* | 3/2005 | Repetto | ................ | G02B 27/017 359/630 |
| 2014/0342790 A1* | 11/2014 | Kim | ...................... | A63F 13/803 463/6 |
| 2015/0015479 A1* | 1/2015 | Cho | ........................ | G06F 3/013 345/156 |
| 2015/0194035 A1* | 7/2015 | Akiva | ...................... | B60Q 9/00 340/575 |

(Continued)

FOREIGN PATENT DOCUMENTS

| | | |
|---|---|---|
| JP | 2005-296382 A | 10/2005 |
| JP | 2008-065593 A | 3/2008 |

(Continued)

OTHER PUBLICATIONS

Office Action Korean Patent Application No. 10-2015-0008156 dated Apr. 1, 2016.

*Primary Examiner* — Kimberly S Berona
*Assistant Examiner* — Michael F Whalen
(74) *Attorney, Agent, or Firm* — McDermott Will & Emery LLP (57) ABSTRACT

A method for providing safety-related information of a vehicle using smart glasses includes performing wireless connection with the vehicle, determining whether a driver does not remain focused on the road, requesting the safety-related information from the vehicle upon determination of inattention to the road, and displaying the safety-related information upon reception of the safety-related information from the vehicle.

14 Claims, 5 Drawing Sheets

(56) References Cited

U.S. PATENT DOCUMENTS

| | | | | |
|---|---|---|---|---|
| 2015/0328985 A1* | 11/2015 | Kim | .................... | H04N 5/23229 |
| | | | | 180/272 |
| 2016/0001781 A1* | 1/2016 | Fung | .................... | G06F 19/345 |
| | | | | 701/36 |
| 2016/0170487 A1* | 6/2016 | Saisho | ............... | G01C 21/3635 |
| | | | | 345/156 |
| 2017/0039782 A1* | 2/2017 | Moeller | .................. | B60R 11/04 |
| 2017/0060234 A1* | 3/2017 | Sung | ....................... | B60R 1/006 |
| 2017/0187963 A1* | 6/2017 | Lee | .................... | H04N 5/23293 |

FOREIGN PATENT DOCUMENTS

| | | |
|---|---|---|
| JP | 2008-230296 A | 10/2008 |
| JP | 2012-115505 A | 6/2012 |
| KR | 20-0375359 Y1 | 3/2005 |
| KR | 10-0949743 B1 | 3/2010 |
| KR | 10-2010-0046872 A | 5/2010 |
| KR | 10-2012-0048981 A | 5/2012 |
| KR | 10-2012-0127790 A | 11/2012 |
| KR | 10-2013-0059827 A | 6/2013 |
| KR | 10-2013-0063911 A | 6/2013 |
| KR | 10-2014-0049897 A | 4/2014 |

\* cited by examiner

METHOD FOR EXECUTING VEHICLE FUNCTION USING WEARABLE DEVICE AND VEHICLE FOR CARRYING OUT THE SAME

CROSS-REFERENCE TO RELATED APPLICATION

This application claims the benefit of priority to Korean Patent Application No. 10-2015-0008156 filed on Jan. 16, 2015, which is hereby incorporated by reference as if fully set forth herein.

TECHNICAL FIELD

The present disclosure relates to a method for providing various safety-related functions using a mobile appliance worn by a driver in a vehicle and a vehicle capable of carrying out the same.

BACKGROUND

Usage of in-vehicle multimedia systems is increasing and functions of in-vehicle multimedia systems are becoming complex according to needs of users. Operation of these in-vehicle multimedia systems having various functions is likely to frequently cause a driver to not keep eyes on the road and risk of car accidents increases as inattention to the road increases. Hence, although attempts to keep drivers focused during traveling, such as DMB system regulations, have been made to prevent distraction of the driver during traveling, this is insufficient to prevent accidents due to distraction of the driver.

Meanwhile, in addition to the regulations, a variety of in-vehicle safety assistance devices are used to give a warning to a driver during traveling or to arouse the driver's attention. One example of these safety assistance devices is illustrated in FIGS. 1A-D.

FIGS. 1A-D illustrate one example of an in-vehicle safety assistance device.

Figure 1A:
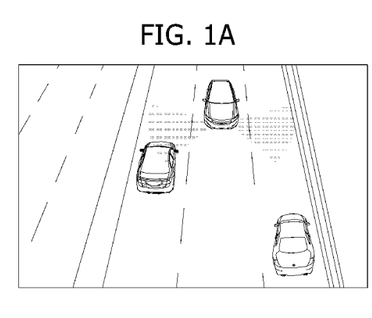
FIGS. 1A-1D illustrate an exemplary configuration of an in-vehicle multimedia system.
Figure 1B:
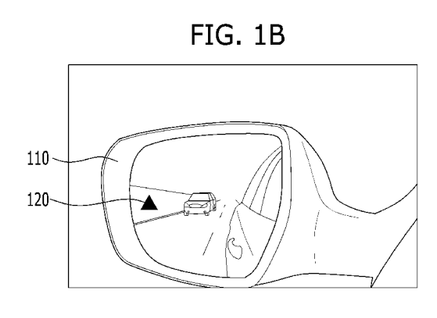

Referring to FIG. 1A, sensors are mounted to rear positions and lateral rear positions of a vehicle to sense whether other vehicles or obstacles are present at blind spots at the rear and the lateral rear sides of the vehicle. The vehicle may turn on a lamp 120 mounted in a side mirror 110 as illustrated in FIG. 1B based on sensed results to visually notify a driver of the presence of another vehicle at a blind spot in a corresponding direction or behind the vehicle.

Figure 1C:
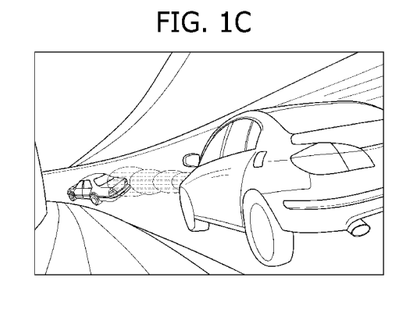
Figure 1D:
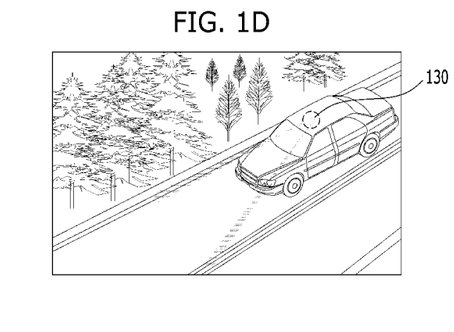

In addition, various other safety assistance devices have been applied to vehicles, for example, a Smart Cruise Control (SCC) system that automatically controls a vehicle speed based on a distance between a corresponding vehicle and a vehicle located ahead thereof, the distance being sensed using distance sensors mounted to the front of the vehicle as illustrated in FIG. 1C, or a lane departure prevention system that arouses the driver's attention via various methods, including, e.g., generation of a warning sound or pulling of a safety belt when a vehicle departs from a lane based on a sensed result of an optical sensor 130 as illustrated in FIG. 1D.

The technologies as described above may assist a driver in recognizing any erroneous vehicle traveling due to distraction of the driver through issue of a warning and may aid in maintenance of a distance between a corresponding vehicle and another vehicle ahead thereof via smart cruise control even if the driver does not remain focused on the road.

However, since the driver who does not remain focused on the road cannot view scenes and warnings at the front and the rear lateral sides of the vehicle, the aforementioned existing technologies are not sufficient safety regimes to keep drives focused.

SUMMARY

Accordingly, the present disclosure is directed to a method for executing a vehicle function using a wearable device and a vehicle for carrying out the same that substantially obviate one or more problems due to limitations and disadvantages of the related art.

An object of the present disclosure is to provide a method for sensing driver's inattention to the road and directly providing a driver with information regarding safety around a vehicle and an apparatus for carrying out the same.

Additional advantages, objects, and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these objects and other advantages and in accordance with the purpose of the inventive concept, as embodied and broadly described herein, a method for providing safety-related information of a vehicle using smart glasses includes performing wireless connection with the vehicle, determining whether a driver does not remain focused on the road, requesting the safety-related information from the vehicle upon determination of inattention to the road, and displaying the safety-related information upon reception of the safety-related information from the vehicle.

In certain embodiments, the step of determining whether the driver does not remain focused on the road may include: determining a gaze direction of the driver via a first camera facing the eye of the driver; acquiring a forward image via a second camera facing forward; and determining whether the driver does not remain focused on the road by applying the determined gaze direction to the acquired forward image.

In certain embodiments, the step of determining whether the driver does not remain focused on the road may include: determining a current facing direction; determining a reference direction using a gyro sensor; and determining whether the driver does not remain focused on the road using a difference between the current facing direction and the determined reference direction.

In certain embodiments, the smart glasses may display the received safety-related information on a Head Mounted Display (HMD).

In certain embodiments, the safety-related information may include at least one of a distance between the vehicle and another vehicle ahead thereof, the presence of a third vehicle at blind spots, the presence of a fourth vehicle at a lateral rear side of the vehicle, a surrounding image of the vehicle, and whether the vehicle departs from a lane.

In accordance with another aspect of the present inventive concept, smart glasses may include a wireless communication unit configured to interchange data with a vehicle in a wireless manner, at least one camera configured to capture an image to determine whether a driver does not remain focused on the road, a controller configured to determine, based on the image, whether the driver does not remain focused on the road and to request safety-related information from the vehicle upon determination of inattention to the road, and a display configured to display the safety-related information upon reception of the safety-related information from the vehicle.

In certain embodiments, the at least one camera may include: a first camera oriented to face the eye of the driver; and a forwardly oriented second camera. The controller may be configured to determine a gaze direction of the driver based on a first image acquired via the first camera and determine whether the driver does not remain focused on the road by applying the determined gaze direction to a second image acquired via the second camera.

In certain embodiments, the smart glasses may further include a gyro sensor configured to sense variation in direction. The controller may be configured to determine a reference direction using the gyro sensor and to determine whether the driver does not remain focused on the road using a difference between a current facing direction and the determined reference direction.

In accordance with another aspect of the present inventive concept, a vehicle includes at least one sensor module configured to acquire safety-related information, a wireless communication unit connected to smart glasses in a wireless manner, and an Audio Video Navigation (AVN) system configured to acquire the safety-related information from the at least one sensor module when the smart glasses request the safety-related information and to control the wireless communication unit so as to transmit the safety-related information to the smart glasses.

In certain embodiments, the sensor module may include at least one of a smart cruise control sensor, a blind spot sensor, a lateral rear side distance sensor, an around-view module, and a lane departure detection sensor.

In accordance with a further aspect of the present inventive concept, a control method of a vehicle includes performing wireless connection with smart glasses, receiving a request for safety-related information from the smart glasses due to inattention to the road, acquiring the safety-related information from at least one sensor module, and transmitting the acquired safety-related information to the smart glasses.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of embodiments of the invention and are incorporated in and constitute a part of this application, illustrate embodiment(s) of the invention and together with the description serve to explain the principle of the invention. In the drawings.

DETAILED DESCRIPTION

Hereinafter, reference will now be made in detail to the embodiments of the present invention, examples of which are illustrated in the accompanying drawings. In the drawings, the same or similar elements are denoted by the same reference numerals even though they are depicted in different drawings, and a detailed description of the same or similar elements will be omitted. The suffixes "module" and "unit" of elements herein are used for convenience of description and thus can be used interchangeably and do not have any distinguishable meanings or functions.

In addition, in the following description of the embodiments disclosed herein, a detailed description of related known technologies will be omitted when it may make the subject matter of the embodiments disclosed herein rather unclear. In addition, the accompanying drawings have been included only for a better understanding of the embodiments disclosed herein and are not intended to limit technical ideas disclosed herein, and it should be understood that the accompanying drawings are intended to encompass all modifications, equivalents and substitutions included in the sprit and scope of the present invention.

An embodiment of the present invention is a method for detecting whether a driver does not remain focused on the road during traveling, and displaying safety-related information such as, for example, lane departure, approach of a next lane vehicle, presence of another vehicle ahead or behind (and in blind spots of) a corresponding vehicle, a distance between both the vehicles, and surrounding images, on a display of smart glasses, thereby reducing the likelihood of accidents due to inattention to the road.

Hereinafter, the method for providing safety-related information as described above will be described in detail with reference to FIGS. 2A-2C.

Figure 2A:
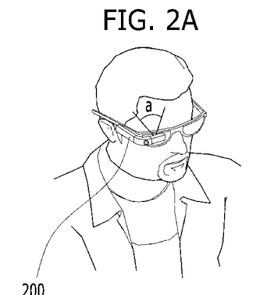
FIGS. 2A-2C illustrate an exemplary process of providing safety information using smart glasses according to an embodiment of the present invention.
Figure 2B:
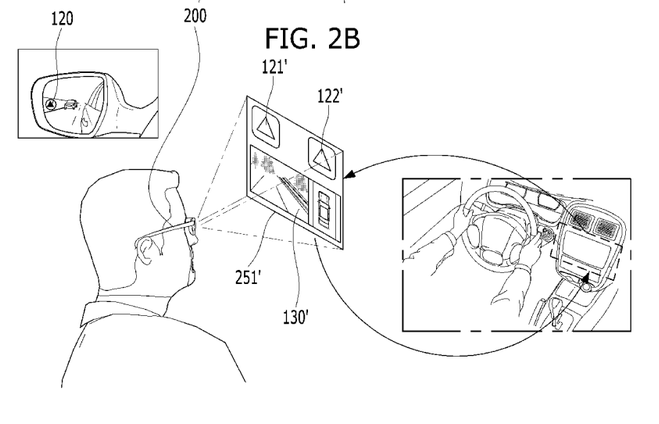
Figure 2C:
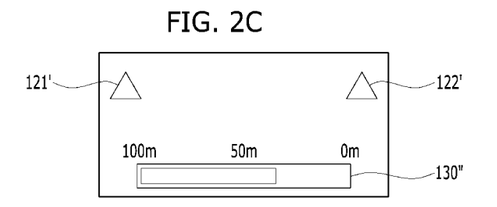

FIGS. 2A-2C illustrate an exemplary process of providing safety information using smart glasses according to an embodiment of the present invention.

In FIGS. 2A-2C, there is assumed a state in which smart glasses worn by a driver are completely connected to an in-vehicle AVN system that supports a wireless connection function or a wireless communication system connected to the AVN system via wireless communication such as, for example, Bluetooth or Wi-Fi. Of course, this is given by way of example and it is clear to those skilled in the art that the AVN system may be replaced with any other in-vehicle systems so long as they are capable of providing safety-related information according to the present disclosure.

Referring to FIG. 2A, the smart glasses 200 worn by the driver are provided with a camera that is oriented in a direction a facing the driver's eye so as to detect a gaze direction of the driver. In addition, the smart glasses 200 further include a forwardly oriented camera to capture an image of the front side, i.e. an image in a direction in which the head of the driver faces. Accordingly, the smart glasses 200 are capable of determining, based on the image of the front side, whether the head of the driver faces forward (e.g., recognizing the position of an A-pillar or the position of a dashboard from the image of the front side) and also capable of finally determining whether the driver does not remain focused on the road by applying the gaze direction to the image. In addition (or alternatively) to the gaze direction determination method using the cameras, a gyro sensor may be applied to the smart glasses 200. For example, when a direction in which the smart glasses 200 face, sensed by the gyro sensor, is concentrated in a specific direction, the smart glasses 200 may set the specific direction as a forward direction. Then, when a direction newly sensed by the gyro sensor deviates from the specific direction beyond a certain range, it may be determined that the driver does not remain focused on the road.

Upon determination of inattention to the road during traveling, as exemplarily illustrated in FIG. 2B, the smart glasses 200 may request safety-related information (e.g., lane departure, approach of a next lane vehicle, and presence of a forward/rearward vehicle) from the AVN system, and display the corresponding information on a head mounted display (HMD) upon receiving the same from the AVN system. Alternatively, the safety information may be displayed in another location in the vehicle that is visible to the driver.

For example, a display object 121' that represents a lamp 120 of a left side mirror may be displayed at the left side in a display area 251' and a display object 122' that represents the lamp 120 of a right side mirror may be displayed at the right side in the display area 251'. In addition, a lane departure warning image 130' may be displayed at the center of the display area 251'. In the case in which an around-view system or a front camera for provision of a surrounding image is installed to the vehicle, a real-time image captured by this around-view system or the front camera may be displayed.

In another example, as exemplarily illustrated in FIG. 2C, along with the display objects 121' and 122' for warning of lateral blind spots, information 130" regarding a distance between the corresponding vehicle and a vehicle ahead thereof may be displayed via the display of the smart glasses 200.

The above-described process will be described in a flowchart form with reference to FIG. 3.

Figure 3:
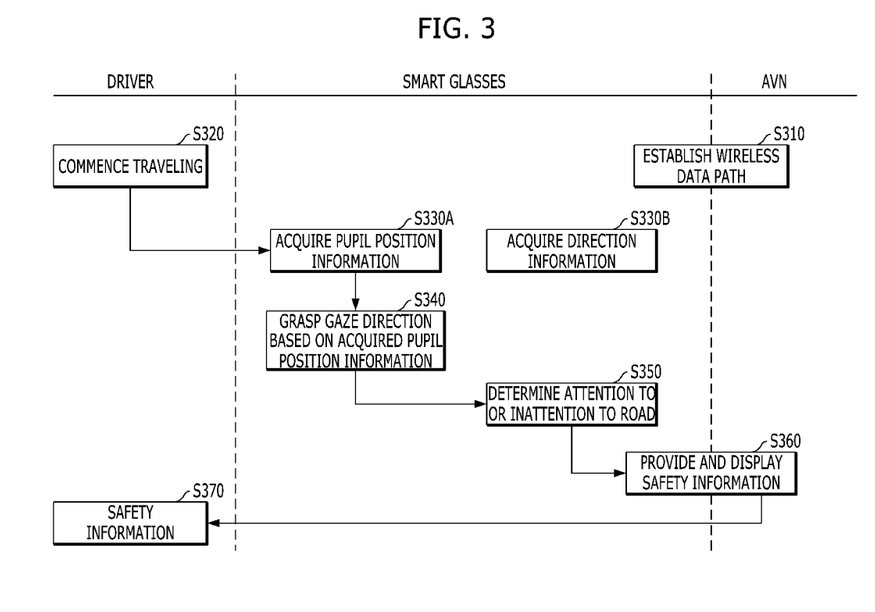
FIG. 3 is a flowchart illustrating an exemplary process of providing safety information using smart glasses according to an embodiment of the present invention.

FIG. 3 is a flowchart illustrating an exemplary process of selecting a vehicle function using a wearable appliance and executing the function according to an embodiment of the present invention.

Referring to FIG. 3, first, smart glasses of the driver are connected to the AVN system (S310). Then, as the driver commences traveling (S320), the smart glasses determine whether the driver does not remain focused on the road.

For example, the smart glasses may acquire pupil position information from an image captured by the camera facing the driver's eye (S330A), and determine a gaze direction of the driver based on the acquired information (S340). Of course, to this end, a captured image of the front side as described above may also be used. In addition, the gaze direction of the driver may be determined as the gyro sensor senses a direction in which the smart glasses face (S330B).

The smart glasses may determine, based on the gaze direction of the driver, whether the driver does not remain focused on the road (S350). Upon determination of inattention to the road, the smart glasses may acquire safety-related system by requesting the AVN system for the safety-related information and then display the acquired information via the display thereof (S360).

In this way, even if the driver does not remain focused on the road, the driver may visually receive safety-related information to take a required measure (S370).

Hereinafter, a configuration of an apparatus for implementation of the above-described embodiments will be described.

Figure 4:
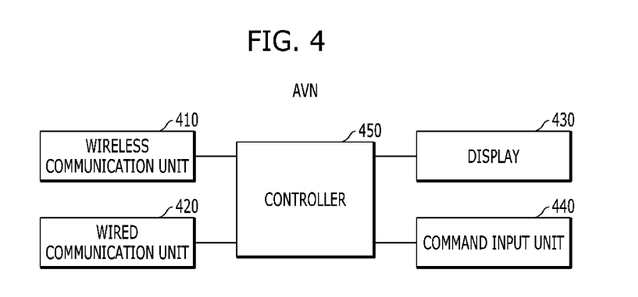
FIG. 4 is a block diagram illustrating an exemplary configuration of an AVN system according to an embodiment of the present invention.

An exemplary configuration of the AVN system to perform the above-described function is illustrated in FIG. 4.

FIG. 4 is a block diagram illustrating the exemplary configuration of the AVN system according to an embodiment of the present invention.

Referring to FIG. 4, the AVN system of the vehicle may include a wireless communication unit 410 connected to the smart glasses to interchange various control signals and safety-related information via wireless communication such as, for example, Bluetooth or Wi-Fi, a wired communication unit 420 to interchange signals with other in-vehicle controllers that function to acquire safety-related information (e.g., a smart cruise controller, blind-spot sensor controller, lateral rear side distance sensor controller, and around-view system controller), a display 430 to display a list or execution screen of various functions, a command input unit 440 to receive a command from the driver such as, for example, a touchpad or key buttons, and a controller 450 to control the aforementioned components, the controller 450 performing determination and calculation required for implementation of the present embodiment. For example, when the smart glasses request safety-related information, the controller 450 may control the wired communication unit 420 to collect safety-related information from the associated controllers and transmit the collected information to the smart glasses via the wireless communication unit 410.

Of course, the configuration of FIG. 4 is given by way of example and may include a different number of components as needed. For example, the wireless communication unit may be incorporated in a controller outside of the AVN system, and a sound output unit to output a multimedia or navigation guide sound or a warning sound.

Next, a configuration of the smart glasses will be described with reference to FIG. 5.

Figure 5:
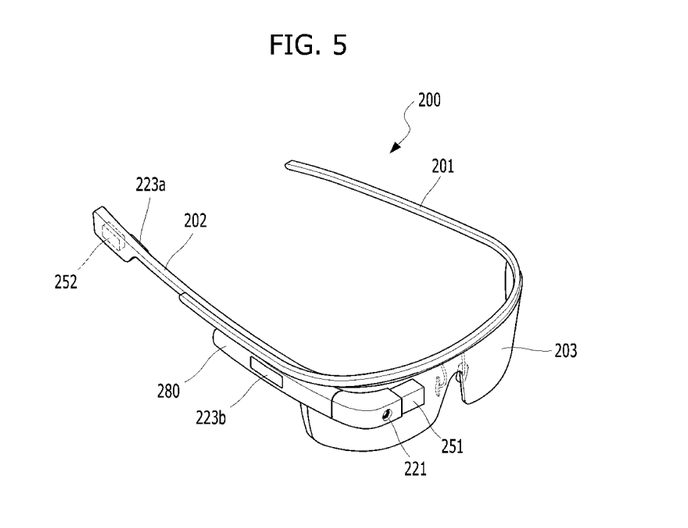
FIG. 5 is a view illustrating exemplary smart glasses applicable to the embodiments of the present invention.

FIG. 5 is a view illustrating exemplary smart glasses applicable to the embodiments of the present invention.

The smart glasses 200 are configured to be worn on the human head. To this end, the smart glasses 200 may include a frame unit (e.g., a case or a housing). The frame unit may be formed of a flexible material for easy wearing. FIG. 5 illustrates an embodiment of the frame unit including a first frame 201 and a second frame 202 formed of different materials.

The frame unit is supported by the head and internally defines a space for installation of various components. As illustrated, electronic components such as, for example, a control module 280 and a sound output module 252 may be mounted to the frame unit. In addition, a lens 203 to cover at least one of the left eye and the right eye may be separably coupled to the frame unit.

The control module 280 is adapted to control a variety of electronic components incorporated in the smart glasses 200. For example, the control module 280 may establish a wireless data path between the smart glasses 200 and the in-vehicle AVN system via a wireless communication unit (not shown) of the smart glasses 200 and enable request and reception of information regarding safety of the vehicle through the established data path. In addition, the control module 280 may allow the received safety-related information to be displayed on the display 251, and determine a gaze direction of the driver using at least one of images captured by the camera oriented to face the eye and a front camera 221. In addition, the control module 280 may judge, based on the determined gaze direction or a direction sensed by a gyro sensor (not shown), whether the driver does not remain focused on the road.

Although FIG. 5 illustrates the control module 280 installed to one side of the frame unit, the position of the control module 280 is not limited thereto.

In certain embodiments, a display 251 may take the form of a head mounted display (HMD). The HMD is a display that is worn on the head of a user to display an image immediately in front of the user's eyes. To provide an image immediately in front of the user's eyes when the user wears the smart glasses 200, the display 251 may be located to correspond to at least one of the left eye and the right eye. FIG. 5 illustrates the display 251 as being located to correspond to the right eye so as to output an image toward the right eye of the user.

In certain embodiments, the display 251 may project an image to the user's eye using a prism. In certain embodiments, the prism may be transparent to allow the user to view both the projected image and a general forward visual range (i.e. a viewing range through the user's eyes).

As described above, in certain embodiments, the image output through the display 251 may overlap a general visual range. The smart glasses 200 may help in selection of a function by the driver without preventing the driver from remaining focused on the road during traveling through the use of this characteristic of the display 251.

In certain embodiments, the camera 221 is located proximate to at least one of the left eye and the right eye to capture a forward image. The camera 221 located proximate to the eye may acquire an image of a scene that the user views.

Although FIG. 5 illustrates the camera 221 as being incorporated in the control module 280, the position of the camera 221 is not limited thereto. In certain embodiments, the camera 221 may be installed to the frame unit and a plurality of cameras may be used to acquire a stereoscopic image. In addition, a camera (not shown in FIG. 5) oriented to face the user's eye may be additionally installed opposite to the forwardly oriented camera 221. The camera oriented to face the user's eye is adapted to acquire an image for determining a gaze direction of the driver by tracking the user's pupil.

In certain embodiments, the smart glasses 200 may include command input units 223*a* and 223*b* operated to receive a control command. The command input units 223*a* and 223*b* may be operated by touch or push action, for example.

An embodiment of the present invention as described above may be implemented as a computer readable code of a computer readable medium in which programs are recorded. The computer readable medium includes all kinds of recording devices in which data that may be read by a computer system is stored. Examples of the computer readable medium may include a hard disk drive (HDD), a solid state disk (SSD), a silicon disk drive (SDD), ROM, a RAM, a CD-ROM, a magnetic tape, a floppy disk, and an optical data storage device. In addition, the computer readable recording medium includes a carrier wave (e.g., data transmission over the Internet).

Accordingly, the above detailed description is not intended to be construed to limit the present invention in all aspects and should be considered by way of example. The scope of the present invention should be determined by reasonable interpretation of the accompanying claims and all equivalent modifications made without departing from the present invention should be included in the following claims.

As is apparent from the above description, the following effects are acquired according to at least one embodiment of the present invention.

When a driver does not remain focused on the road, information regarding safety around a vehicle may be displayed via smart glasses, which results in enhanced safety.

In particular, since the smart glasses are capable of always transmitting visual information to the eyes of the driver who wears the smart glasses, the information regarding safety may be transmitted to the driver even while the driver does not remain focused on the road.

It will be appreciated by persons skilled in the art that the effects that can be achieved through the present invention are not limited to what has been particularly described hereinabove and other advantages of the present invention will be more clearly understood from the above detailed description.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method for providing safety-related information of a vehicle using smart glasses which comprise a wireless communication unit, at least one camera, a controller, and a display, the method comprising steps of:
   establishing, by the wireless communication unit, a wireless connection between the smart glasses and the vehicle;
   determining, by the controller, whether a driver does not remain focused on a road based on an image captured by the at least one camera;
   requesting, by the controller, the safety-related information from the vehicle upon determination of inattention to the road; and
   displaying, by the display, the safety-related information upon reception of the safety-related information from the vehicle,
   wherein the step of displaying the safety-related information comprises displaying at least two of a distance between the vehicle and another vehicle ahead thereof, a presence of a third vehicle at a blind spot, a first image indicating a presence of a fourth vehicle at a left rear side of the vehicle, a second image indicating a presence of a fifth vehicle at a right rear side of the vehicle, a surrounding image of the vehicle, a third image indicating whether the vehicle departs from a lane, and a real-time frontal image, simultaneously, and
   wherein the step of displaying the safety-related information further comprises displaying the first image at a left side of a display area on the display configured with the smart glasses, the second image at a right side of the display area, and the third image at a center of the display area, simultaneously.

2. The method according to claim 1, wherein the step of determining whether a driver does not remain focused on a road includes:
   determining a gaze direction of the driver via a first camera facing the eye of the driver;
   acquiring a forward image via a second camera facing forward; and
   determining whether the driver does not remain focused on the road by applying the determined gaze direction to the acquired forward image.

3. The method according to claim 1, wherein the step of determining whether a driver does not remain focused on a road includes:
   determining a current facing direction;
   determining a reference direction using a gyro sensor; and determining whether the driver does not remain focused on the road using a difference between the current facing direction and the determined reference direction.

4. The method according to claim 1, wherein the smart glasses display the received safety-related information on a Head Mounted Display (HMD).

5. The method according to claim 1, wherein the step of displaying the safety-related information further comprises displaying the fourth vehicle at the lateral rear side of the vehicle at a side of the display area of the smart glasses, and the image indicating whether the vehicle departs from the lane at the center of the display area of the smart glasses, simultaneously.

6. Smart glasses comprising:
a wireless communication unit configured to interchange data with a vehicle in a wireless manner;
at least one camera configured to capture an image to determine whether a driver does not remain focused on a road;
a controller configured to determine, based on the image, whether the driver does not remain focused on the road and to request safety-related information from the vehicle upon determination of inattention to the road; and
a display configured to display the safety-related information upon reception of the safety-related information from the vehicle,
wherein the display displays at least two of a distance between the vehicle and another vehicle ahead thereof, a presence of a third vehicle at a blind spot, a first image indicating a presence of a fourth vehicle at a left rear side of the vehicle, a second image indicating a presence of a fifth vehicle at a right rear side of the vehicle, a surrounding image of the vehicle, a third image indicating whether the vehicle departs from a lane, and a real-time frontal image, simultaneously, and
wherein the display displays the first image at a left side of a display area on the display configured with the smart glasses, the second image at a right side of the display area, and the third image at a center of the display area, simultaneously.

7. The smart glasses according to claim 6, wherein the at least one camera includes:
a first camera oriented to face the eye of the driver; and
a forwardly oriented second camera,
wherein the controller is configured to determine a gaze direction of the driver via the first camera and determine whether the driver does not remain focused on the road by applying the determined gaze direction to a forward image acquired via the second camera.

8. The smart glasses according to claim 6, further comprising a gyro sensor configured to sense variation in direction,
wherein the controller is configured to determine a reference direction using the gyro sensor and to determine whether the driver does not remain focused on the road using a difference between a current facing direction and the determined reference direction.

9. The smart glasses according to claim 6, wherein the display is a Head Mounted Display (HMD) configured to display the received safety-related information.

10. The smart glasses according to claim 6, wherein the display displays the presence of a fourth vehicle at a lateral rear side of the vehicle at a side of a display area on the display and the third image indicating whether the vehicle departs from the lane at a center of the display area on the display, simultaneously.

11. A vehicle comprising:
at least one sensor module configured to acquire safety-related information;
a wireless communication unit connected to smart glasses in a wireless manner; and
an Audio Video Navigation (AVN) system configured to acquire the safety-related information from the at least one sensor module when the smart glasses request the safety-related information and to control the wireless communication unit so as to transmit the safety-related information to the smart glasses,
wherein the safety-related information includes at least two of a distance between the vehicle and another vehicle ahead thereof, a first image indicating a presence of a fourth vehicle at a left rear side of the vehicle, a second image indicating a presence of a fifth vehicle at a right rear side of the vehicle, a surrounding image of the vehicle, a third image indicating whether the vehicle departs from a lane, and a real-time frontal image,
wherein the AVN system is configured to control the wireless communication unit to transmit at least two of the safety-related information to the smart glasses, such that the smart glasses display at least two of the transmitted safety-related information, simultaneously, and
wherein the smart glasses display the first image at a left side of a display area on a display configured with the smart glasses, the second image at a right side of the display area, and the third image at a center of the display area, simultaneously.

12. The vehicle according to claim 11, wherein the at least one sensor module includes at least one of a smart cruise control sensor, a blind spot sensor, a lateral rear side distance sensor, an around-view module, and a lane departure detection sensor.

13. A control method of a vehicle which comprises at least one sensor module, a wireless communication unit, and an Audio Video Navigation (AVN) system, the control method comprising steps of:
establishing, by the wireless communication unit, a wireless connection between the vehicle and smart glasses;
receiving, by the AVN system, a request for safety-related information from the smart glasses due to inattention to a road;
acquiring, by the AVN system, the safety-related information from the at least one sensor module; and
transmitting, by the AVN system, the acquired safety-related information to the smart glasses,
wherein the safety-related information includes at least two of a distance between the vehicle and another vehicle ahead thereof, a first image indicating a presence of a fourth vehicle at a left rear side of the vehicle, a second image indicating a presence of a fifth vehicle at a right rear side of the vehicle, a surrounding image of the vehicle, a third image indicating whether the vehicle departs from a lane, and a real-time frontal image,
wherein the step of transmitting the acquired safety-related information comprises transmitting at least two of the safety-related information to the smart glasses, such that the smart glasses display the at least two of the transmitted safety-related information, simultaneously,
wherein the step of transmitting the acquired safety-related information further comprises transmitting the first image at a left side of a display area on a display configured with the smart glasses, the second image at a right side of the display area, and the third image at a center of the display area, simultaneously.

14. The control method according to claim 13, wherein the at least one sensor module includes at least one of a smart cruise control sensor, a blind spot sensor, a lateral rear side distance sensor, an around-view module, and a lane departure detection sensor.

\* \* \* \* \*